(12) United States Patent
Makihara (10) Patent No.: US 9,957,905 B2
(45) Date of Patent: May 1, 2018

(54) ENGINE SYSTEM AND CONTROL METHOD FOR ENGINE SYSTEM

(71) Applicant: TOYOTA JIDOSHA KABUSHIKI KAISHA, Toyota-shi, Aichi-ken (JP)

(72) Inventor: Masaki Makihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 549 days.

(21) Appl. No.: 14/626,278

(22) Filed: Feb. 19, 2015

(65) Prior Publication Data
US 2015/0240732 A1  Aug. 27, 2015

(30) Foreign Application Priority Data
Feb. 26, 2014 (JP) .................. 2014-035021

(51) Int. Cl.
*F02D 41/00* (2006.01)
*F01M 13/00* (2006.01)
(Continued)

(52) U.S. Cl.
CPC ......... *F02D 41/0007* (2013.01); *F01M 13/00* (2013.01); *F01M 13/02* (2013.01); *F01M 13/022* (2013.01); *F01M 13/028* (2013.01); *F02B 37/183* (2013.01); *F02D 41/0025* (2013.01); *F01M 2013/026* (2013.01); *F01M 2013/027* (2013.01)

(58) Field of Classification Search
CPC ............ F02D 41/0007; F02D 41/0025; F01M 13/022; F01M 13/02; F01M 13/028; F01M 13/00; F01M 2013/027; F01M 2013/026; F02B 37/183
USPC .......................................................... 60/602
See application file for complete search history.

(56) References Cited

U.S. PATENT DOCUMENTS

2009/0308364 A1* 12/2009 Konohara ............ F01M 13/022
                                                              123/572
2014/0224232 A1*  8/2014 Hotta ..................... F02M 26/35
                                                              123/574
(Continued)

FOREIGN PATENT DOCUMENTS

JP    2009-138618 A    6/2009
JP    2009-299645 A   12/2009
(Continued)

*Primary Examiner* — Jason T Newton
(74) *Attorney, Agent, or Firm* — Oliff PLC (57) ABSTRACT

An engine system includes an internal combustion engine, a forced induction device, an ejector device, a blow-by gas passage, and a controller. The ejector device has an ejector and a drive gas passage connected to an intake passage of the engine in a manner bypassing a compressor of the forced induction device. The controller is adapted to execute a temperature raising control when the controller determines that condensate water is likely to freeze in the ejector device. In the temperature raising control, the controller raises intake air pressure in a downstream portion of the intake passage with respect to the compressor compared to when the controller determines that the condensate water is unlikely to freeze and adjusts an intake air amount of the engine to restrain increase of the intake air amount that would be caused by increase in the intake air pressure.

6 Claims, 4 Drawing Sheets

(51) Int. Cl.
  *F02B 37/18* (2006.01)
  *F01M 13/02* (2006.01)

(56) References Cited

U.S. PATENT DOCUMENTS

| | | | |
|---|---|---|---|
| 2015/0053188 A1* | 2/2015 | Kuribayashi | F02B 37/183 123/574 |
| 2015/0082790 A1* | 3/2015 | Yoshioka | F02B 37/16 60/605.2 |
| 2015/0247432 A1* | 9/2015 | Fujikawa | F01M 13/023 123/573 |
| 2016/0319732 A1* | 11/2016 | Iwata | F02B 39/005 |
| 2017/0122153 A1* | 5/2017 | Hampton | F01M 13/021 |

FOREIGN PATENT DOCUMENTS

| | | | |
|---|---|---|---|
| JP | 2010-285937 A | 12/2010 | |
| JP | 2012-237231 A | 12/2012 | |
| JP | 2013-096357 A | 5/2013 | |
| JP | 2013-124544 A | 6/2013 | |
| JP | 2013185545 | 9/2013 | |
| JP | 2013-221488 A | 10/2013 | |
| WO | 2013/073010 A1 | 5/2013 | |
| WO | WO 2013073010 A1 * | 5/2013 | F02B 37/183 |

* cited by examiner

ENGINE SYSTEM AND CONTROL METHOD FOR ENGINE SYSTEM

BACKGROUND OF THE INVENTION

The present invention relates to an engine system and a control method for the engine system.

Engine systems include a blow-by gas recirculating device for recirculating blow-by gas, which is fuel gas leaking from the combustion chamber of an internal combustion engine into the crankcase. The blow-by gas recirculating device has a blow-by gas passage through which the intake passage and the crankcase communicate with each other. The blow-by gas recirculating device recirculates blow-by gas by discharging the blow-by gas from the crankcase into the intake passage via the blow-by gas passage.

For example, an engine system disclosed in Japanese Laid-Open Patent Publication No. 2013-124544 includes a blow-by gas recirculating device and a forced-induction device including a compressor arranged in an intake passage. The engine system also includes an ejector device. The ejector device discharges blow-by gas into the intake passage using intake air pressure raised through operation of the compressor, which is boost pressure.

The ejector device includes a drive gas passage and an ejector. The drive gas passage is connected to the intake passage in a manner bypassing the compressor. The ejector is arranged in the drive gas passage. The ejector communicates with the crankcase. As the compressor is operated through operation of the engine, the boost pressure is raised to cause air to flow in the drive gas passage and the ejector. Such airflow draws blow-by gas from the crankcase into the ejector. After having been drawn into the ejector, the blow-by gas passes through the drive gas passage and is then introduced into the intake passage, together with the air.

Since the blow-by gas is produced in the engine in a heated state, the blow-by gas is heated. In contrast, the air drawn into the intake passage is comparatively cold.

Accordingly, if the compressor is operated through operation of the engine in a significantly low-temperature environment, cold intake air flows into the ejector via the drive gas passage and thus cools the interior of the ejector. The blow-by gas, which is in a heated state, is drawn into the ejector, which is in a cold state. This rapidly cools the blow-by gas in the drive gas passage and in the ejector. Water contained in the blow-by gas is thus condensed to produce condensate water. The condensate water may freeze.

Once the condensed water freezes, the drive gas passage and the ejector become partially or entirely clogged. This decreases the flow amount of the air and blow-by gas, thus hampering appropriate recirculation of the blow-by gas.

SUMMARY OF THE INVENTION

Accordingly, it is an objective of the present invention to provide an engine system and a control method for the engine system capable of restraining freezing of condensate water in an ejector device.

To achieve the foregoing objective and in accordance with one aspect of the present invention, an engine system is provided that includes an internal combustion engine, a forced induction device, an ejector device, a blow-by gas passage, and a controller. The forced induction device has a compressor arranged in an intake passage of the engine. The compressor pressurizes and delivers intake air. The ejector device has a drive gas passage connected to the intake passage in a manner bypassing the compressor and an ejector arranged in the drive gas passage. The blow-by gas passage allows communication between the interior of a crankcase of the engine and the interior of the ejector. The controller is adapted to execute a temperature raising control when the controller determines that condensate water is likely to freeze in the ejector device. In the temperature raising control, the controller raises intake air pressure in a downstream portion of the intake passage with respect to the compressor compared to when the controller determines that the condensate water is unlikely to freeze and adjusts an intake air amount of the engine to restrain increase of the intake air amount that would be caused by increase in the intake air pressure.

To achieve the foregoing objective and in accordance with another aspect of the present invention, a control method for an engine system is provided. The engine system includes an internal combustion engine, a forced induction device having a compressor arranged in an intake passage of the engine, an ejector device having a drive gas passage connected to the intake passage in a manner bypassing the compressor and an ejector arranged in the drive gas passage, and a blow-by gas passage allowing communication between the interior of a crankcase of the engine and the interior of the ejector. The method includes: determining whether condensate water is likely to freeze in the ejector device; and executing a temperature raising control when a determination that the condensate water is likely to freeze is made. Executing the temperature raising control includes: raising an intake air pressure in a downstream portion of the intake passage with respect to the compressor compared to when a determination that the condensate water is unlikely to freeze is made, and adjusting an intake air amount of the engine to restrain increase of the intake air amount that would be caused by increase in the intake air pressure.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An engine system according to one embodiment will now be described.

Figure 1:
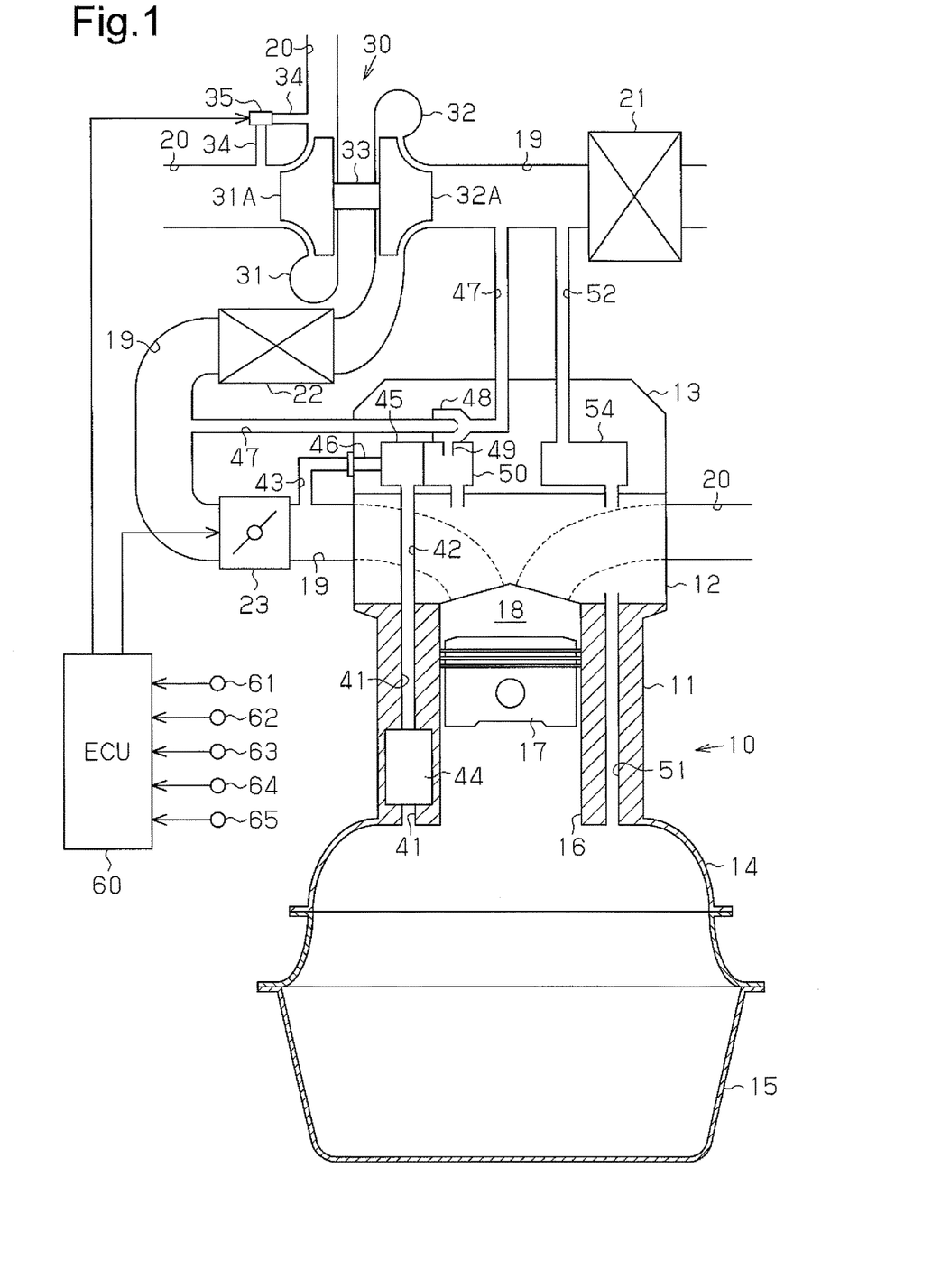
FIG. 1 is a diagram schematically showing the configuration of an engine system according to one embodiment.

As shown in FIG. 1, an internal combustion engine 10 includes a cylinder block 11, a cylinder head 12 arranged in an upper portion of the cylinder block 11, and a head cover 13 mounted on an upper portion of the cylinder head 12. The engine 10 has a crankcase 14 formed in a lower portion of the cylinder block 11 and an oil pan 15 attached to a lower portion of the crankcase 14. The oil pan 15 retains lubricant oil.

The cylinder block 11 includes cylinders 16, which are arranged inside the cylinder block 11 (only one of the cylinders 16 is shown in FIG. 1). A piston 17 is arranged reciprocally in each of the cylinders 16. Combustion chambers 18 are each formed by the inner peripheral wall of a cylinder 16, the top surface of a piston 17, and the lower surface of the cylinder head 12.

The engine 10 has an exhaust-driven type forced induction device 30. The forced induction device 30 has an exhaust turbine 31 arranged in an exhaust passage 20 of the engine 10 and a compressor 32 provided in an intake passage 19 of the engine 10. A turbine wheel 31A in the exhaust turbine 31 and a compressor impeller 32A in the compressor 32 are connected together by a shaft 33 in an integrally rotational manner.

When the engine 10 is operated, a great amount of exhaust gas is blown onto the turbine wheel 31A, thus rotating the turbine wheel 31A together with the compressor impeller 32A. The intake air flowing in the intake passage 19 is thus pressurized and forcibly delivered to the combustion chambers 18.

A bypass passage 34 is connected to the exhaust passage 20 of the engine 10 in a manner bypassing the exhaust turbine 31. The bypass passage 34 allows communication between an upstream portion and a downstream portion of the exhaust passage 20 with respect to the exhaust turbine 31. A wastegate valve 35 serving as a changing mechanism capable of selectively opening and closing the bypass passage 34 is arranged in the bypass passage 34.

An air cleaner 21 for filtering intake air, a compressor 32, an intercooler 22 for cooling the intake air that has passed through the compressor 32, and a throttle valve 23 capable of changing the cross-sectional area of the intake passage 19 are arranged in the intake passage 19 of the engine 10 in this order from the upstream side.

The engine 10 includes a blow-by gas recirculating device, which recirculates blow-by gas into the intake air. The blow-by gas is burned gas leaking from each combustion chamber 18 into the crankcase 14 through a gap produced in the portion where the associated cylinder 16 and the piston 17 (specifically, the piston ring of the piston 17) slide on each other. The blow-by gas recirculating device includes a first breather passage and a second breather passage each as a passage for discharging the blow-by gas from inside the crankcase 14 into the intake passage 19.

The first breather passage includes a first passage section 41, a second passage section 42, and a third passage section 43. The first breather passage extends to allow communication between a downstream portion of the intake passage 19 with respect to the throttle valve 23 and the interior of the crankcase 14.

The first passage section 41 is extended in the cylinder block 11 to include an end having an opening facing the interior of the crankcase 14 and an opposite end having an opening formed in a connection surface between the cylinder block 11 and the cylinder head 12. A first oil separator 44 for separating oil mist from the gas passing through the first passage section 41 is arranged in the first passage section 41.

The second passage section 42 extends in the cylinder head 12 and has an end communicating with the first passage section 41 and an opposite end connected to a volume chamber 45, which is provided in the head cover 13.

The third passage section 43 is extended to include an end connected to the volume chamber 45 via a positive crankcase ventilation (PCV) valve 46 and an opposite end connected to a portion of the intake passage 19 between the throttle valve 23 and the cylinder head 12. The PCV valve 46 is a differential pressure operated valve. The greater the difference by which the pressure in the portion between the PCV valve 46 and the crankcase 14 (in other words, the pressure in the volume chamber 45) than the pressure in the portion between the PCV valve 46 and the intake passage 19 (in other words, the pressure in the intake passage 19), the greater the opening degree of the PCV valve 46 becomes. If the pressure in the volume chamber 45 is lower than or equal to the pressure in the intake passage 19, the PCV valve 46 is closed. That is, the PCV valve 46 prohibits introduction of intake air from the intake passage 19 into the crankcase 14 through the first breather passage and permits discharge of gas containing blow-by gas from inside the crankcase 14 into the intake passage 19.

The second breather passage has a drive gas passage 47, an ejector 48, and a gas suction passage 49.

The drive gas passage 47 is connected to the intake passage 19 in a manner bypassing the compressor 32 and allows communication between an upstream portion and a downstream portion of the intake passage 19 with respect to the compressor 32. The ejector 48 is arranged in the drive gas passage 47 and the intake air flowing in the drive gas passage 47 passes through the ejector 48. The gas suction passage 49 communicates with the ejector 48 and with the interior of the cylinder head 12 via a second oil separator 50. The second oil separator 50 separates oil mist from gas passing through the second oil separator 50. In the present embodiment, the drive gas passage 47 and the ejector 48 configure an ejector device. The gas suction passage 49 functions as a blow-by gas passage, which allows communication between the interior of the crankcase 14 of the engine 10 and the interior of the ejector 48.

The ejector device draws gas from the cylinder head 12 into the ejector 48 via the gas suction passage 49 and the second oil separator 50 using force produced by air flowing in the drive gas passage 47. The drawn gas is delivered to the intake passage 19 through the drive gas passage 47 together with the air.

The cylinder block 11 has a gas passage 51, which is extended in the cylinder block 11 to allow communication between the interior of the crankcase 14 and the interior of the cylinder head 12. The gas passage 51 allows gas communication between the interior of the cylinder head 12 and the interior of the crankcase 14.

The blow-by gas recirculating device has an inlet passage 52, which introduces air from the intake passage 19 into the crankcase 14. The inlet passage 52 has an end connected to a portion of the intake passage 19 between the compressor 32 and the air cleaner 21 and an opposite end connected to the interior of the cylinder head 12 via a third oil separator 54. The third oil separator 54 is arranged in the head cover 13 and separates oil mist from gas passing through the third oil separator 54.

The engine system includes an electric control unit (ECU) 60 having a microcomputer, which is a processor, for example, as a peripheral device of the engine 10. The ECU 60, which functions as a controller, receives signals output from various sensors and performs various calculations based on the output signals. The ECU 60 carries out various controls related to operation of the engine 10, such as controls of various devices including a fuel injection valve (not shown), the throttle valve 23, and the wastegate valve 35, in correspondence with results of the calculations.

The aforementioned various sensors include, for example, a speed sensor 61, an intake air amount sensor 62, an outside air temperature sensor 63, a boost pressure sensor 64, and an accelerator sensor 65. The speed sensor 61 detects an engine speed NE, which is the rotational speed of the output shaft (not shown) of the engine 10, for example. The intake air amount sensor 62 detects an intake air amount GA, which is the amount of the air drawn into the engine 10. The outside air temperature sensor 63 detects an outside air temperature THA, which is the temperature of the outside air about the engine 10. The boost pressure sensor 64 detects a boost pressure P, which is the pressure of the intake air in a downstream portion of the intake passage 19 with respect to the throttle valve 23. The accelerator sensor 65 detects an accelerator manipulation amount ACC, which is the amount of manipulation of an accelerator manipulating member.

Operation of the blow-by gas recirculating device will hereafter be described.

The blow-by gas recirculating device discharges blow-by gas from the crankcase 14 into the intake passage 19 via different paths depending on whether the forced induction device 30 is operated in a non-supercharging or low boost-level state (hereinafter, referred to as a "low boost-level time") or a high boost-level state (hereinafter, referred to as a "high boost-level time).

Figure 2:
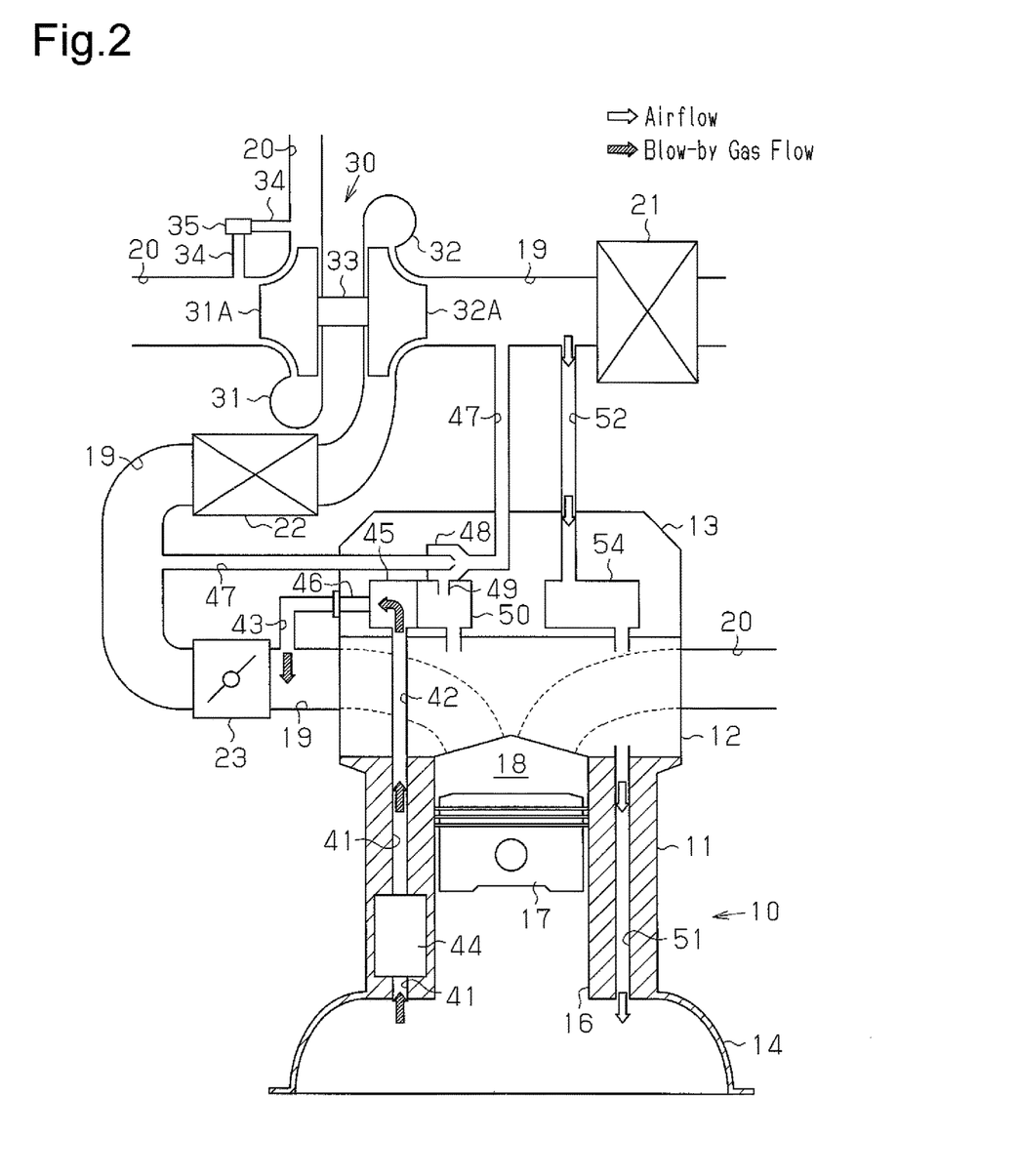
FIG. 2 is a diagram illustrating a mode of operation of the blow-by gas recirculating device of the engine system shown in FIG. 1 at a low boost-level time.

In FIG. 2, the hatched arrows represent flow of the blow-by gas and the blank arrows represent flow of the air.

As illustrated in FIG. 2, at the low boost-level time, the throttle valve 23 restricts the cross-sectional area of the intake passage 19 to such a small value that the boost pressure P becomes lower than the pressure in the crankcase 14.

In the present embodiment, such pressure difference opens the PCV valve 46 and gas containing blow-by gas flows from the crankcase 14 to pass through the first passage section 41, the first oil separator 44, the second passage section 42, and the third passage section 43, which are the first breather passage. After having passed through these passage sections 41 to 43, the gas is discharged into a portion of the intake passage 19 between the throttle valve 23 and the cylinder head 12. Such gas discharge from the crankcase 14 lowers the pressure in the crankcase 14 compared to the pressure in the portion of the intake passage 19 between the compressor 32 and the air cleaner 21. This pressure difference introduces some of the intake air from the intake passage 19 into the crankcase 14 via the inlet passage 52, the third oil separator 54, and the gas passage 51.

Figure 3:
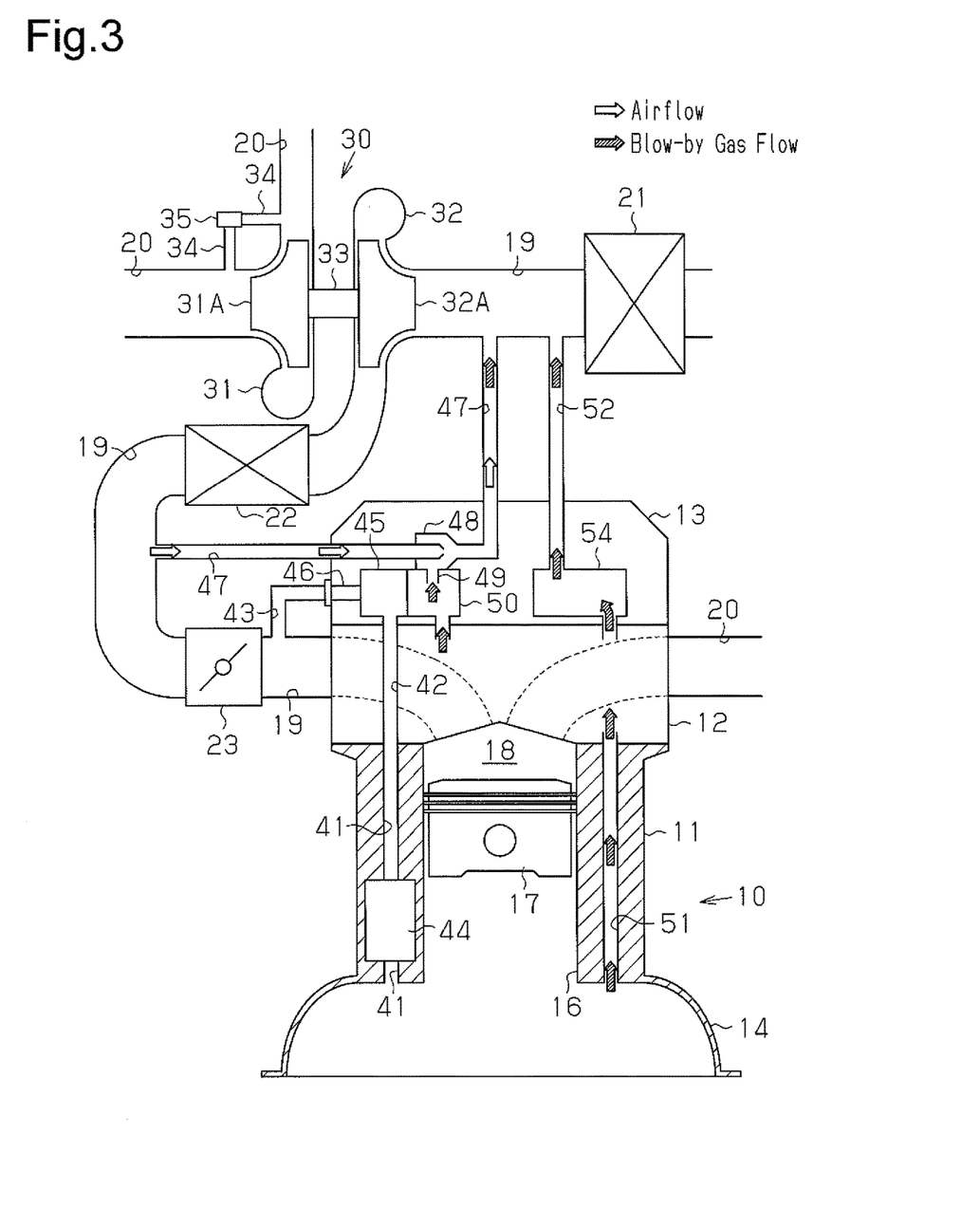
FIG. 3 is a diagram illustrating a mode of operation of the blow-by gas recirculating device of the engine system of FIG. 1 at a high boost-level time.

In FIG. 3, the hatched arrows represent flow of the blow-by gas and the blank arrows represent flow of the air.

With reference to FIG. 3, at the high boost-level time, a great pressure difference is caused between the opposite sides of the compressor 32 in the intake passage 19. This produces airflow in the drive gas passage 47, thus actuating the ejector 48. Gas is drawn from inside the second oil separator 50 into the ejector 48 and discharged, together with the air, into the portion of the intake passage 19 between the air cleaner 21 and the compressor 32 via the drive gas passage 47. That is, gas containing blow-by gas flows from inside the crankcase 14 and passes sequentially through the gas passage 51, the cylinder head 12, the second oil separator 50, the gas suction passage 49, and the drive gas passage 47 before being discharged into the intake passage 19.

At the high boost-level time, the amount of the blow-by gas leaking from the combustion chambers 18 into the crankcase 14 increases and raises the pressure in the crankcase 14. This raises the pressure in the crankcase 14 compared to the pressure in the upstream portion of the intake passage 19 with respect to the compressor 32. Such pressure difference causes the gas containing blow-by gas in the crankcase 14 to flow in a path different from the path including the drive gas passage 47, or, in other words, to pass through the gas passage 51, the cylinder head 12, the third oil separator 54, and the inlet passage 52 in this order before being discharged into the intake passage 19.

Since the blow-by gas is produced in the engine 10 in a heated state, the blow-by gas is heated. In contrast, the air drawn into the intake passage 19 of the engine 10 is comparatively cold. Accordingly, if the compressor 32 is operated through operation of the engine 10 in a significantly low-temperature environment, the cold intake air flows into the ejector 48 through the drive gas passage 47, thus cooling the interior of the ejector 48. The blow-by gas, which is in a heated state, is drawn into the ejector 48, which is in a cold state, through the gas suction passage 49. This rapidly cools the blow-by gas in the drive gas passage 47 and in the ejector 48. This condenses water contained in the blow-by gas, thus producing condensate water, which may freeze. If the condensate water freezes, the drive gas passage 47 and the ejector 48 partially or entirely become clogged. This decreases the flow amount of the air and the flow amount of the blow-by gas in a clogged portion, thus hampering appropriate recirculation of the blow-by gas.

In the engine system, the drive gas passage 47 is connected to the downstream portion of the intake passage 19 with respect to the intercooler 22. The air that has been cooled by the intercooler 22 thus flows into the drive gas passage 47. The air that flows into the drive gas passage 47 and then passes through the ejector 48 thus tends to be cold. As a result, the condensate water tends to freeze in the ejector device.

In the present embodiment, when it is likely that the condensate water will freeze in the ejector device (the drive gas passage 47 and the ejector 48), the wastegate valve 35 is closed.

This increases the amount of exhaust gas passing through the exhaust turbine 31 when the condensate water is likely to freeze in the ejector device, compared to when such freezing is unlikely. The intake air pressure in the downstream portion of the intake passage 19 with respect to the compressor 32 (hereinafter, referred to as "compressor downstream pressure") is thus raised. Correspondingly, the intake air temperature in the downstream portion of the intake passage 19 with respect to the compressor 32 is raised and the temperature of the air that flows from this downstream portion into the drive gas passage 47 and passes through the ejector 48 is also raised. This raises the temperature of the gas in the ejector device, thus restraining generation and freezing of condensate water in the ejector device.

By decreasing the opening degree of the wastegate valve 35 to raise the compressor downstream pressure, freezing of condensate water in the ejector device is restrained. However, when the compressor downstream pressure is raised, the intake air amount GA is increased. This may increase the engine torque.

To solve this problem, in the present embodiment, in addition to raising the compressor downstream pressure in the above-described manner, the throttle opening degree TA is decreased to restrict increase of the boost pressure P and increase of the intake air amount GA, which are caused by the raised compressor downstream pressure. As a result, when condensate water is likely to freeze in the ejector device, not only the compressor downstream pressure is raised to restrain such freezing of the condensate water, but also increase of engine torque caused by the raised compressor downstream pressure is restricted.

Steps for executing a freezing restraint procedure for restraining freezing of condensate water will hereafter be described with reference to FIGS. 4 and 5.

Figure 4:
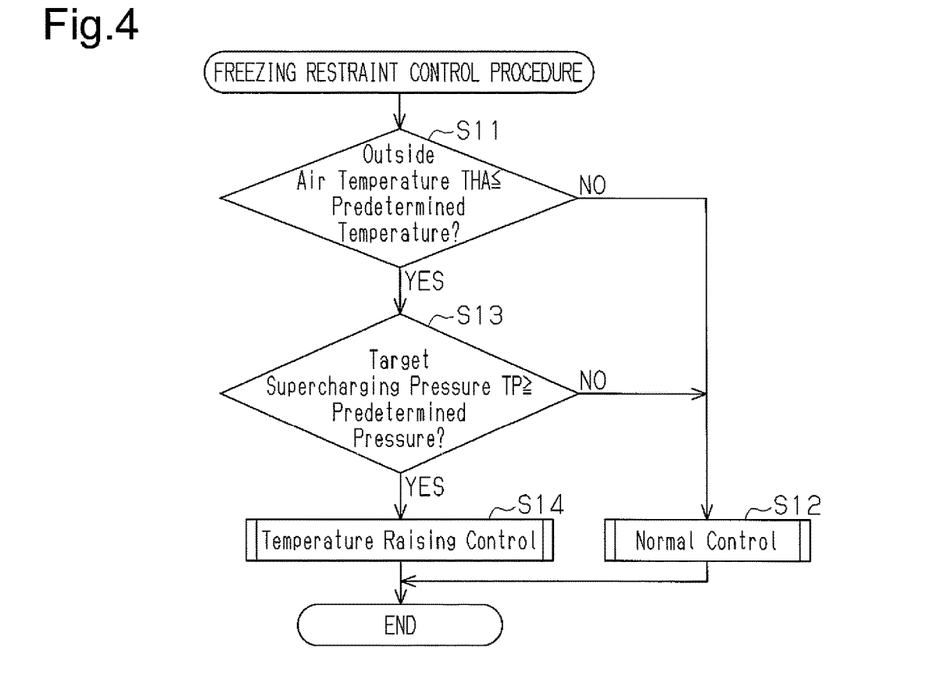
FIG. 4 is a flowchart representing steps for executing a freezing restraint control procedure.

The series of procedure, which is represented by the flowchart of FIG. 4, is carried out by the ECU 60 as an interruption at predetermined intervals.

Referring to FIG. 4, a determination is made as to whether [Condition A], which will be described below, is satisfied (Step S11).

[Condition A] The outside air temperature THA is lower than or equal to a predetermined reference temperature (for example, −20° C.)

The lower the outside air temperature THA, the lower the temperature of the air drawn into the intake passage 19 becomes and, correspondingly, the lower the temperature of the air that flows from the intake passage 19 to the drive gas passage 47 and passes through the ejector 48 becomes. The condensate water thus tends to freeze in the ejector device. In the present embodiment, based on results of various tests and simulations, a value of the outside air temperature THA is determined in advance such that, with reference to the value, a reliable determination is made that the condensate water is likely to freeze in the ejector device. The outside air temperature THA is memorized by the ECU 60 as a reference temperature for [Condition A]. Therefore, in the procedure, based on the fact that [Condition A] is satisfied, a determination that the condensate water is likely to freeze in the ejector device is optimally made.

If [Condition A] is not satisfied (Step S11: NO), normal control is performed on the wastegate valve 35 and the throttle valve 23 (Step S12). The "normal control" refers to control in a normal mode, in which the valves 35, 23 are controlled to achieve control targets corresponding to the engine operating state.

Figure 5:
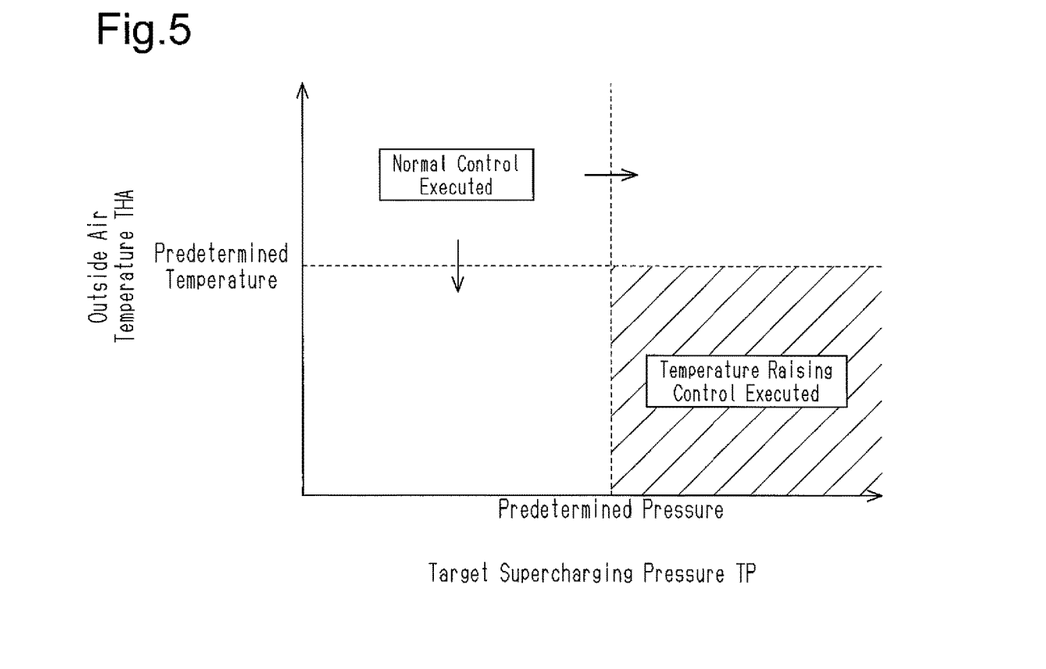
FIG. 5 is a graph representing the relationship among the outside air temperature, a target boost pressure, and an execution range of temperature raising control.

As illustrated in FIG. 5, according to the procedure, it is determined that the likeliness of freezing of the condensate water in the ejector device is significantly low in the range in which the outside air temperature THA is higher than the reference temperature (the range in which [Condition A] is not satisfied). The normal control is thus carried out.

In the normal control, a requested torque, which is a control target of engine torque, is calculated based on the accelerator manipulation amount ACC and the engine speed NE. Also, a target intake air amount, which is a control target of intake air amount, is calculated based on the requested torque. Then, a target throttle opening degree Tta, which is a control target of the throttle opening degree TA, is calculated based on the target intake air amount. The throttle valve 23 is controlled such that the target throttle opening degree Tta and the actual throttle opening degree TA become equal to each other.

In the normal control, a target boost pressure TP, which is a control target of the boost pressure P, is calculated based on the target intake air amount. Then, the difference between the target boost pressure TP and the actual boost pressure P (the difference=TP−P) is calculated and, based on the difference, a target WG opening degree Twg, which is a control target of the opening degree of the wastegate valve 35, is calculated. The wastegate valve 35 is then controlled such that the target WG opening degree Twg and the actual opening degree of the wastegate valve 35 become equal to each other. That is, in the present embodiment, the wastegate valve 35 is controlled such that the target boost pressure TP and the actual boost pressure P become equal to each other.

In contrast, when [Condition A] is satisfied (Step S11 of FIG. 4: YES), it is determined whether [Condition B], which will be described below, is satisfied (Step S13).

[Condition B] The target boost pressure TP is higher than or equal to a predetermined reference pressure (for example, 110 kPa).

In an engine operating range in which the boost pressure is low, the pressure difference between the opposite sides of the compressor 32 in the intake passage 19, which is the pressure difference between the opposite ends of the drive gas passage 47, is small. Airflow into the drive gas passage 47 is thus substantially restricted. This restrains suction of blow-by gas into the ejector 48, thus restricting generation and freezing of the condensate water in the ejector device. Accordingly, in the engine operating range in which the boost pressure is low, freezing of the condensate water in the ejector device is restrained without closing the wastegate valve 35 to raise the compressor downstream pressure.

For example, in an engine operating range with such a small exhaust gas flow amount that supercharging by the forced induction device 30 is prevented, the compressor downstream pressure is raised only to a limited level even if the opening degree of the wastegate valve 35 is decreased. Accordingly, the effect of raising the intake air temperature cannot be expected. As a result, in the aforementioned engine operating range, the effect of restraining freezing of the condensate water in the ejector device is substantially restricted.

In the present embodiment, based on results of various tests and simulations, a value of the target boost pressure TP is determined in advance such that, with reference to the value, a reliable determination is made that the condensate water is likely to freeze in the ejector device and that the compressor downstream pressure can be raised appropriately by closing the wastegate valve 35. The pressure value corresponding to the target boost pressure TP is memorized by the ECU 60 as the reference pressure for [Condition B]. In the present embodiment, the target boost pressure TP in [Condition B] is used as an indicator representing the compressor downstream pressure. Accordingly, if [Condition B] is satisfied, it is reliably determined that it is likely that the condensate water will freeze in the ejector device and that the compressor downstream pressure can be raised appropriately by closing the wastegate valve 35.

When [Condition B] is not satisfied (Step S13: NO), the normal control is performed on the wastegate valve 35 and the throttle valve 23 (Step S12).

With reference to FIG. 5, in the range in which the target boost pressure TP is lower than the reference pressure and [Condition B] is not satisfied, it is determined that the likeliness of freezing of the condensate water in the ejector device is significantly low and that appropriate rise of the compressor downstream pressure cannot be expected to happen even by closing the wastegate valve 35. As a result, the normal control is performed.

In contrast, when [Condition B] is satisfied (Step S13 of FIG. 4: YES) temperature raising control is executed on the wastegate valve 35 and the throttle valve 23 to raise the intake air temperature in the downstream portion of the intake passage 19 with respect to the compressor 32 (Step S14).

In the hatched range of FIG. 5, which is the range in which the outside air temperature THA is lower than the reference temperature and the target boost pressure TP is higher than or equal to the reference pressure, it is determined that the condensate water is likely to freeze in the ejector device and that appropriate rise of the compressor downstream pressure is expected to happen by closing the wastegate valve 35. As a result, the temperature raising control is carried out.

In the temperature raising control, basically by the same calculation procedure as the calculation procedure of the normal control, the requested torque, the target intake air amount, the target throttle opening degree Tta, and the target WG opening degree Twg are calculated. Specifically, the target throttle opening degree Tta and the target boost pressure TP are each calculated as a value by which the wastegate valve 35 is closed and the intake air amount at the time of execution of the temperature raising control is set equal to the intake air amount at the time of execution of the normal control. In the present embodiment, based on results of various tests and simulations, the relationship among the target intake air amount, the target throttle opening degree Tta, and the target boost pressure TP in the temperature raising control is determined in advance and memorized by the ECU 60. In the temperature raising control, the target throttle opening degree Tta and the target boost pressure TP are calculated based on this relationship. Although the wastegate valve 35 is basically closed in the temperature raising control, the wastegate valve 35 may be slightly open depending on the engine operating condition, which is, for example, when the boost pressure P rises unnecessarily.

In this procedure, when [Condition B] is satisfied, it is determined that it is likely that the intake air will flow into the drive gas passage 47 and cause the condensate water to freeze in the ejector device and that the compressor downstream pressure can be raised appropriately by closing the wastegate valve 35. As a result, the temperature raising control is executed. This appropriately restrains freezing of the condensate water in the ejector device.

When the temperature raising control is executed, control of the forced induction device 30 and the engine 10 for achieving the control targets corresponding to the engine operating state is not performed. This may decrease fuel economy performance of the engine 10 advantageously. However, in the present embodiment, if [Condition B] is not satisfied, it is determined that the likeliness of freezing of the condensate water in the ejector device is low or that appropriate rise of the compressor downstream pressure cannot be expected to happen. As a result, the temperature raising control is not carried out and the normal control is executed. Therefore, compared to a case in which the compressor downstream pressure is raised even when [Condition B] is not satisfied, the period in which the forced induction device 30 and the engine 10 are controlled to achieve the control targets corresponding to the engine operating state is prolonged. This restrains decrease of the fuel economy performance of the engine 10.

As has been described, the present embodiment has the advantages described below.

(1) When it is determined that the condensate water is likely to freeze in the ejector device, the compressor downstream pressure is raised compared to when it is determined that the condensate water is unlikely to freeze. Meanwhile, the throttle opening degree TA is decreased to restrain increase of the intake air amount, which is caused by the raised compressor downstream pressure. This raises the temperature of the gas in the ejector device and thus restrains freezing of the condensate water in the ejector device. Further, increase of engine torque, which is caused by the raised compressor downstream pressure, is restrained.

(2) The drive gas passage 47 is connected to the portion of the intake passage 19 between the intercooler 22 and the throttle valve 23. This restrains freezing of condensate water even in an engine system that tends to cause such freezing of condensate water in an ejector device.

(3) When it is likely that the condensate water will freeze in the ejector device, the compressor downstream pressure is raised by closing the wastegate valve 35.

(4) Based on the outside air temperature THA, or, specifically, as long as the outside air temperature THA is lower or equal to the reference temperature, it is optimally determined that the condensate water is likely to freeze in the ejector device.

(5) The temperature raising control is carried out when the target boost pressure TP is higher than or equal to the reference pressure. As a result, freezing of condensate water in the ejector device is appropriately restrained and decrease of fuel economy performance of the engine 10, which is caused by the raised compressor downstream pressure, is restricted.

The above illustrated embodiment may be modified as follows.

In the procedure of Step S11 of the freezing restraint control procedure of FIG. 4, a determination may be made as to whether the intake air temperature in the intake passage 19 is lower than or equal to a reference temperature, instead of whether [Condition A] is satisfied. As the intake air temperature of this procedure, the intake air temperature in any suitable portion of the intake passage 19, including the intake air temperature in the portion of the intake passage 19 between the air cleaner 21 and the compressor 32, the intake air temperature in the portion between the compressor 32 and the intercooler 22, and the intake air temperature in the portion between the intercooler 22 and the throttle valve 23, may be detected and employed.

In the procedure of Step S11 of the freezing restraint control procedure, a determination may be made as to whether the gas temperature in the ejector device, which is the gas temperature in the drive gas passage 47 or the ejector 48, is lower than or equal to a reference temperature, instead of whether [Condition A] is satisfied.

In the procedure of Step S13 of the freezing restraint control procedure, an estimated boost pressure may be calculated and used when the temperature raising control is executed. The estimated boost pressure is the target boost pressure TP in a condition in which it is assumed that the temperature raising control is not executed, which is a condition in which it is assumed that the normal control is in execution. In this case, if the target boost pressure TP is expected to become lower than the reference pressure through suspension of the temperature raising control and execution of the normal control, the temperature raising control is suspended and the normal control is carried out even when the actual boost pressure TP is higher than the reference pressure at the time of execution of the temperature raising control. As a result, freezing of condensate water in the ejector device is appropriately restrained and decrease of fuel economy performance of the engine 10, which is caused by the raised compressor downstream pressure, is restricted in a desired manner.

In the step of Step S13 of the freezing restraint control procedure, a determination may be made as to whether the compressor downstream pressure is lower than or equal to a reference pressure, instead of whether [Condition B] is satisfied. As the compressor downstream pressure, a detection value detected by a pressure sensor arranged in the portion of the intake passage 19 between the interceder 22 and the throttle valve 23 may be employed. Alternatively, an estimated value that is estimated based on the engine operating state, such as the engine speed NE, the throttle opening degree TA, or the intake air amount GA, may be used.

The procedure of Step S13 of the freezing restraint control procedure may be omitted.

Instead of executing the temperature raising control when the target boost pressure TP is higher than or equal to the reference pressure, the temperature raising control may be carried out when the target boost pressure TP is higher than or equal to a first reference pressure P1 (for example, 110 kPa) and lower than or equal to a second reference pressure P2 (P1<P2 [for example, 220 kPa]).

In an engine operating range with a high boost pressure, the intake air temperature in the downstream portion of the intake passage 19 with respect to the compressor 32 is high and the temperature of the air flowing from the intake passage 19 into the drive gas passage 47 is comparatively high. As a result, in some engine systems, freezing of condensate water in an ejector device can be restrained even without raising the compressor downstream pressure by closing the wastegate valve 35. If the temperature raising control is carried out when the target boost pressure TP is higher than or equal to the first reference pressure and lower than or equal to the second reference pressure, the normal control is carried out in the engine operating range with a high boost pressure. As a result, freezing of condensate water in the ejector device is appropriately restrained and decrease of fuel economy performance of the engine 10, which is caused by the raised compressor downstream pressure, is restricted in a desired manner.

In an engine system having an adjustment mechanism other than the throttle mechanism having the throttle valve 23 as an adjustment mechanism for adjusting the intake air amount GA of the engine 10, the adjustment mechanism may be controlled to restrain increase of the intake air amount GA, which is caused by raised compressor downstream pressure, in the temperature raising control. Examples of the adjustment mechanism include a variable valve lift mechanism, which varies the maximum valve lift of the intake valve, and a variable valve opening duration mechanism that varies the opening period of an intake valve, which is the valve opening duration of the intake valve, may be cited. To restrain increase of the intake air amount GA caused by the raised compressor downstream pressure, an engine system having the variable valve lift mechanism may decrease the maximum valve lift and an engine system having the variable valve opening duration mechanism may decrease the valve opening duration.

In the temperature raising control, the compressor downstream pressure is raised by closing the wastegate valve 35. However, the compressor downstream pressure may be raised by decreasing the opening degree of the wastegate valve 35 at the time of execution of the temperature raising control compared to the opening degree at the time of execution of the normal control. Also in this case, when it is determined that the condensate water is likely to freeze in the ejector device, the amount of the exhaust gas passing through the exhaust turbine 31 is increased to raise the compressor downstream pressure, compared to when it is determined that the condensate water is unlikely to freeze.

The control device of the above illustrated embodiment may be used in an engine system in which the drive gas passage 47 is connected to the portion of the intake passage 19 between the intercooler 22 and the compressor 32. The control device of the embodiment may also be used in an engine system lacking the intercooler 22.

In an engine system having a variable displacement type forced induction device having a changing mechanism for varying the relationship between the exhaust gas flow amount and the supercharging amount, the compressor downstream pressure may be raised by controlling the changing mechanism such that the supercharging amount with respect to the exhaust gas flow amount becomes great at the time of execution of the temperature raising control, compared to the time of execution of the normal control. As an example of this type of forced induction device, a variable nozzle type forced induction device having a variable nozzle mechanism for varying the flow speed of exhaust gas blown onto an exhaust turbine may be cited.

The present invention may be used not only in an engine system having an exhaust-driven type forced induction device but also in either an engine system having an engine-driven type forced induction device driven by the output shaft of the engine or an engine system including an electrically driven type forced induction device driven by an electric motor.

Therefore, the present examples and embodiments are to be considered as illustrative and not restrictive and the invention is not to be limited to the details given herein, but may be modified within the scope and equivalence of the appended claims.

The invention claimed is:
1. An engine system comprising:
an internal combustion engine;
a forced induction device having a compressor arranged in an intake passage of the engine, the compressor pressurizes and delivers intake air;
an ejector device including: a drive gas passage connected to the intake passage in a manner bypassing the compressor, and an ejector arranged in the drive gas passage;
a blow-by gas passage communicating between an interior of a crankcase of the engine and an interior of the ejector; and
a controller configured to execute a temperature raising control by:
determining whether condensate water is likely to freeze in the ejector device based on one of: an outside air temperature around the engine, an intake air temperature in the intake passage, or a gas temperature in the ejector device;
in response to determining that the condensate water is likely to freeze, increasing intake air pressure in a downstream portion of the intake passage with respect to the compressor; and
adjusting an intake air amount of the engine that limits increase of the intake air amount caused by the increase in the intake air pressure in the downstream portion of the intake passage.
2. The engine system according to claim 1, further comprising an intercooler that is arranged in the downstream portion of the intake passage with respect to the compressor to cool the intake air, the drive gas passage is connected to a downstream portion of the intake passage with respect to the intercooler.

3. The engine system according to claim 1,
wherein the forced induction device is an exhaust-driven forced induction device having an exhaust turbine arranged in an exhaust passage of the engine,
the engine system further comprising: (i) a bypass passage connected to the exhaust passage in a manner bypassing the exhaust turbine, and (ii) a wastegate valve arranged in the bypass passage, and
wherein the controller increases the intake air pressure in the downstream portion of the intake passage by decreasing an opening degree of the wastegate valve.

4. The engine system according to claim 1, wherein, in response to determining that the condensate water is likely to freeze and the intake air pressure is higher than or equal to a predetermined reference pressure, the controller executes the temperature raising control.

5. A control method for an engine system, the engine system including an internal combustion engine, a forced induction device having a compressor arranged in an intake passage of the engine, an ejector device having a drive gas passage connected to the intake passage in a manner bypassing the compressor and an ejector arranged in the drive gas passage, and a blow-by gas passage communicating between an interior of a crankcase of the engine and an interior of the ejector, the method comprising:
  determining whether condensate water is likely to freeze in the ejector device based on one of: an outside air temperature around the engine, an intake air temperature in the intake passage, or a gas temperature in the ejector device; and
  in response to determining that the condensate water is likely to freeze, executing a temperature raising control including:
  increasing an intake air pressure in a downstream portion of the intake passage with respect to the compressor; and
  adjusting an intake air amount of the engine that limits increase of the intake air amount caused by the increase in the intake air pressure in the downstream portion of the intake passage.

6. The method according to claim 5, further comprising:
determining whether the intake air pressure is higher than or equal to a predetermined reference pressure, and
in response to determining that the condensate water is likely to freeze and the intake air pressure is higher than or equal to the reference pressure, executing the temperature raising control.

* * * * *